United States Patent Office 3,396,163
Patented Aug. 6, 1968

3,396,163
DERIVATIVES OF 5-NITRO-2-FURALDEHYDE
Wilfred Herbert Hook, Brooklands, Sale, and Jack Raymond Green, Romiley, England, assignors to Geigy Chemical Corporation, Greenburgh, N.Y., a corporation of Delaware
No Drawing. Filed Sept. 10, 1965, Ser. No. 486,532
Claims priority, application Great Britain, Sept. 12, 1964, 37,390/64
4 Claims. (Cl. 260—240)

ABSTRACT OF THE DISCLOSURE

5 - nitro - 2-furfurylidene- amino-triazolones of the formula:

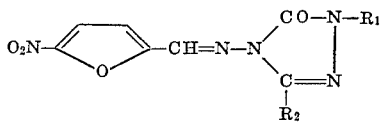

wherein $R_1$ is hydrogen, or hydroxy-lower alkyl, halogen-lower alkyl, lower alkanoyl, lower alkenoyl or lower alkoxycarbonyl, and $R_2$ is hydrogen or lower alkyl, are disclosed to have useful antimicrobial properties, being valuable antibacterial, antifungal, anthelminthic or coccidiostatic agents for external use in human or veterinary medicine. 4 - (5'-nitro-2' - furfurylideneamino) - 1:2:4-triazolone-5 is particularly useful.

---

The present invention relates to substituted heterocyclic organic compounds, and in particular to nitrofuryl derivatives of aminotriazolones.

According to the present invention, there is provided a 5-nitro-2-furfurylidene-amino-triazolone of the formula

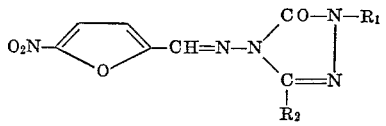

wherein $R_1$ is hydrogen, or hydroxy-lower alkyl, halogen-lower alkyl, lower alkanoyl, lower alkenoyl or lower alkoxycarbonyl, and $R_2$ is hydrogen or lower alkyl.

The alkyl as mentioned in the definition of $R_1$ may be straight- or branched-chained and may be, for example, methyl, ethyl, n-propyl, isopropyl, n-butyl, isobutyl, tertiary butyl, n-amyl or isoamyl. If $R_1$ is alkyl substituted by halogen, the halogen may be fluorine or iodine but is preferably chlorine or bromine. If $R_1$ is alkanoyl or-alkenoyl, this may be, for examle, formyl, acetyl, propionyl, n-butyryl, n-valeryl or n-caproyl or crotonyl. If $R_1$ is alkoxycarbonyl, this is preferably methoxycarbonyl or ethoxycarbonyl. If $R_2$ is lower alkyl, this may be, for example, methyl, ethyl etc. up to amyl.

The invention also provides a process of producing a 5-nitro-2-furfurylidene-amino-triazolone of Formula I, which comprises condensing 5-nitro-2-furaldehyde, or a derivative yielding 5-nitro-2-furaldehyde under the conditions of the reaction, with a substituted 4-amino-triazolone having the Formula II

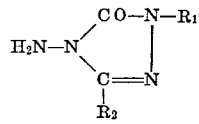

or a salt thereof, wherein $R_1$ and $R_2$ have the significance as given under Formula I.

The condensation may be effected, for instance, by heating the 5-nitro-2-furaldehyde, or functional derivative thereof, with the substituted 4-amino-triazolone, or salt thereof, in the presence of an organic solvent substantially inert under the reaction conditions. Conveniently the reactants may be heated together in the solvent at the boiling point under reflux. The organic solvent may be, for example, ethanol. The reaction mixture may be heated for a duration within a wide range, but may conveniently be heated for from a few minutes up to 1 hour.

The substituted 4-amino-triazolones used as reactants in this process of the invention, having the Formula II wherein $R_1$ is hydrogen and $R_2$ is hydrogen or lower alkyl, may be produced, for example, by reacting carbohydrazide with the corresponding alkyl or aralkyl ortho-monocarboxylate having the Formula III $$R_2\text{---}C(OR_3)_3 \qquad \text{(III)}$$

wherein $R_2$ is hydrogen or lower alkyl and $R_3$ is lower alkyl or aralkyl.

Preferred alkyl or aralkyl ortho-monocarboxylates of Formula III have $R_3$ as methyl, ethyl, propyl, isoproyl or benzyl. The reaction may be effected, for instance, by refluxing together the ortho-ester III and carbohydrazide, and removing the alcohol $R_3OH$ which is formed, conveniently by distillation. The alkyl ortho-monocarboxylate may be an ethyl ortho-monocarboxylate, for example ethyl ortho-formate, ethyl ortho-acetate or ethyl ortho-propionate.

Substituted 4-amino-triazolones used as reactants in the process having the Formula II where $R_1$ is hydroxy-substituted alkyl, the alky being straight- or branched-chain and containing at least two carbon atoms, may be produced by reacting the corresponding halide having the Formula IV $$R_2\text{---}X \qquad \text{(IV)}$$

with the corresponding arylidene-substituted compound having the Formula V

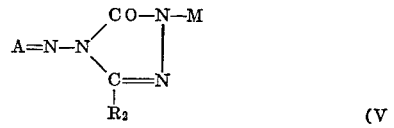

and hydrolysing the grouping $A\text{=}N\text{---}$ to an amino group, wherein X is chlorine, bromine or iodine, A represents an arylidene group, preferably a benzylidene group, M represents sodium, lithium, or potassium, but preferably sodium, $R_1$ is hydroxy-substituted alkyl, the alkyl being straight- or branched-chain and containing at least 2 carbon atoms, and $R_2$ has the significance as given under Formula I.

The present invention also provides a process of producing a 5-nitro-2-furfurylidene-amino-triazolone of Formula I, wherein $R_1$ represents alkanoyl or alkenoyl, which comprises acylating a 5-nitro-2-furfurylidene-amino-triazolone of Formula I wherein $R_1$ represents hydrogen.

The acylation may be carried out using a conventional acylating agent, for instance, by heating with the anhydride or mixed anhydride or acid chloride of the corresponding monocarboxylic acid $R_1\cdot OH$, for example, with the anhydride of acetic, propionic, n-butyric, n-valeric or n-caproic acid or a mixed anhydride thereof or a mixed anhydride of formic acid. Conveniently the reactants are heated together at the boiling point of the mixture under reflux.

The present invention also provides a process of producing a 5-nitro-2-furfurylidene-amino-triazolone of Formula I, wherein $R_1$ represents hydroxymethyl, which comprises hydroxymethylating a 5-nito-2-furfurylidene-amino-triazolone of Formula I, wherein $R_1$ represents hydrogen, with formaldehyde or with a substance yielding formaldehyde under the conditions of the reaction. The hydroxymethylation may be carried out, for instance, by heating with aqueous formaldehyde solution, conveniently by boiling together under reflux. The concentration of formaldehyde in the aqueous solution is preferably from 1% to 10% by weight based on the weight of the solution.

The 5-nitro-2-furfurylidene-amino-triazolone compounds of Formula I, wherein $R_1$ is halogen-substituted alkyl, may be produced by halogen-exchange of the hydroxy group of the corresponding hydroxyalkyl-substituted-5-nitro-2-furfurylidene-amino-triazolone. The halogen-exchange reaction may be carried out by a conventional method, for instance, by reacting with thionyl chloride, thionyl bromide, phosphorus pentachloride or phosphorus pentabromide.

The 5-nitro-2-furfurylidene-amino-triazolone compounds of Formula I, wherein $R_1$ is alkoxycarbonyl, may be produced by carbalkoxylating the corresponding 5-nitro-2-furfurylidene-amino-triazolone of Formula I wherein $R_1$ is hydrogen. The reaction may be carried out, for example, by reacting with an alkyl chloroformate, conveniently in the presence, as reaction medium, of pyridine and/or in the presence of an organic solvent substantially inert under the conditions of the reaction.

The 5-nitro-2-furfurylidene-amino-triazolone compounds of the present invention may also be produced by nitration of the corresponding 2-furfurylidene-amino-triazolones having the Formula VI

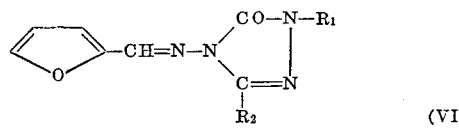

(VI)

wherein $R_1$ and $R_2$ have the significance as given under Formula I.

The nitration may be carried out with nitric acid under conditions conventional in nitrating substituted furyl derivatives, for instance, in the presence of a water binding agent; the water binding agent may be, for example, sulphuric acid, but is preferably acetic anhydride. If desired, a proportion of acetic acid may be present in the reaction mixture. The nitration is preferably carried out at a temperature not exceeding 15° C. using concentrated or fuming nitric acid.

The 5-nitro-2-furfurylidene-amino-triazolone compounds of Formula I wherein $R_1$ represents hydrogen may also be produced by cyclising the 5-nitro-2-furaldehyde-carbohydrazone having the Formula VII

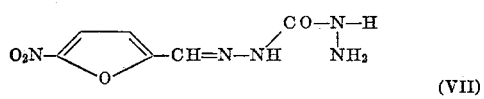

(VII)

with an alkyl or aralkyl ortho-monocarboxylate having the Formula III $$R_2\text{---}C(OR_3)_3 \qquad (III)$$

wherein $R_2$ and $R_3$ have the significance as given above under Formula III.

The reaction may be carried out, for instance, by heating together, preferably by boiling under reflux, and removing the alcohol $R_3OH$ which is formed, conveniently by distillation.

The compounds of the invention have useful pharmacological and in particular antimicrobial properties, being valuable antibacterial, antifungal, anthelminthic or coccidiostatic agents for external use in human or veterinary medicine. The compounds may also be used to protect an organic material susceptible to bacterial, fungal or other microbial deterioration by contacting with, impregnation in or otherwise treating the material with the compounds.

Compounds of Formula I wherein at least one of the groups $R_1$ and $R_2$ is hydrogen are particularly valuable antimicrobial agents, especially the compound of Formula I wherein both $R_1$ and $R_2$ are hydrogen. In living organisms they are active, for example, against general staphylococcal infections.

Accordingly, the invention also provides a composition comprising an antimicrobially effective proportion of a 5-nitro-2-furfurylidene-amino-triazolone of Formula I and a pharmacologically acceptable solid carrier or liquid diluent.

The invention also provides a method of protecting an organic material susceptible to bacterial, fungal or other microbial attack which comprises treating the material with a 5-nitro-2-furfurylidene-amino-triazolone of Formula I. The organic material may be, for instance, a natural or synthetic polymeric material, a proteinaceous or carbohydrate substance, or a natural or synthetic fibre or textile material formed therefrom.

The following examples further illustrate the present invention.

EXAMPLE 1

To a solution of 10 g. of 4-amino-1:2:4-triazolone-5 in 120 ml. of normal aqueous hydrochloric acid was added 14.1 g. of 5-nitro-2-furaldehyde in 200 ml. of ethanol. The mixture was heated to reflux for a short time and then allowed to cool slowly to room temperature. The crystalline yellow solid which formed was collected by filtration, recrystallised from dimethyl formamide and dried in vacuum at 100° C. The product was 4-(5'-nitro-2'-furfurylidene-amino)-1:2:4-triazolone-5, having melting point 216° C. with decomposition.

EXAMPLE 2

The procedure described in Example 1 was carried out using 3-methyl-4-amino-1:2:4-triazolone-5 instead of 4-amino-1:2:4-triazolone-5, the reaction conditions being otherwise essentially the same.

The product was 3-methyl-4-(5'-nitro-2'-furfurylidene-amino)-1:2:4-triazolone-5, having melting point 267° C. with decomposition.

The 3-methyl-4-amino-1:2:4-triazolone-5 used as reactant was prepared as follows:

A mixture of 78 g. of ethyl ortho-acetate and 25 g. of carbohydrazide was refluxed for 6 hours. The ethanol formed in the reaction was removed by distillation, finally under reduced pressure, and crude 3-methyl-4-amino-1:2:4-triazolone-5 was obtained as a residue having melting point 130° C.

EXAMPLE 3

The procedure described in Example 1 was carried out using 3-ethyl-4-amino-1:2:4-triazolone-5 instead of 4-amino-1:2:4-triazolone-5, the reaction conditions being otherwise essentially the same.

The product was 3-ethyl-4-(5'-nitro-2'-furfurylidene-amino)-1:2:4-triazolone-5, having melting point 240° C. with decomposition.

The 3-ethyl-4-amino-1:2:4-triazolone-5 used as reactant was prepared as follows:

A mixture of 90 g. of ethyl ortho-propionate and 30 g. of carbohydrazide was refluxed for 6 hours. The ethanol formed in the reaction was removed by distillation, finally under reduced pressure, and 3-ethyl-4-amino-1:2:4-triazolone-5 was obtained as a yellow syrup which was used without further purification for reaction with 5-nitro-2-furaldehyde.

EXAMPLE 4

A mixture of 15 g. of 4-(5'-nitro-2'-furfurylidene-amino)-1:2:4-triazolone-5 and 50 ml. of acetic anhydride was heated at reflux for 1 minute. After cooling and standing, the fawn crystals were collected, washed with ethanol and dried in vacuum at 100° C.

The product was 1-acetyl-4-(5'-nitro-2'-furfurylidene-amino)-1:2:4-triazolone-5, having melting point 205° C.

EXAMPLE 5

The procedure described in Example 4 was carried out using propionic anhydride instead of acetic anhydride, the reaction conditions being otherwise essentially the same.

The product was 1-propionyl-4-(5′-nitro-2′-furfurylidene- amino)-1:2:4-triazolone-5, having melting point 204° C.

EXAMPLE 6

The procedure described in Example 4 was carried out using n-butyric anhydride instead of acetic anhydride, the reaction conditions being otherwise essentially the same.

The product was 1-n-butyryl-4-(5′-nitro-2′-furfurylidene-amino)-1:2:4-triazolone-5, having melting point 174° C.

EXAMPLE 7

The procedure described in Example 4 was carried out using n-valeric anhydride instead of acetic anhydride, the reaction conditions being otherwise essentially the same.

The product was 1-n-valeryl-4-(5′-nitro-2′-furfurylidene-amino)-1:2:4-triazolone-5, having melting point 154° C.

EXAMPLE 8

The procedure described in Example 4 was carried out using n-caproic anhydride instead of acetic anhydride, the reaction conditions being otherwise essentially the same.

The product was 1 - n - caproyl - 4 - (5′ - nitro - 2′ - furfurylidene-amino)-1:2:4-triazolone-5, having melting point 144° to 145° C.

EXAMPLE 9

The procedure described in Example 4 was carried out using 3 - methyl - 4 - (5′ - nitro - 2′ - furfurylidene - amino) - 1:2:4 - triazolone - 5 instead of 4 - (5′ - nitro-2′-furfurylidene-amino)-1:2:4-triazolone-5, the reaction conditions being otherwise essentially the same.

The product was 1-acetyl-3-methyl-4-(5′-nitro-2′-furfurylidene-amino)-1:2:4-triazolone-5, having melting point 203° to 205° C.

EXAMPLE 10

The procedure described in Example 4 was carried out using 3 - methyl - 4 - (5′ - nitro - 2′ - furfurylidene - amino) - 1:2:4 - triazolone - 5 instead of 4 - (5′ - nitro-2′ - furfurylidene - amino) - 1:2:4 - triazolone - 5 and propionic anhydride instead of acetic anhydride, the reaction conditions being otherwise essentially the same.

The product was 1 - propionyl - 3 - methyl - 4 - (5′-nitro - 2′ - furfulylidene - amino) - 1:2:4 - triazolone - 5, having melting point 205° C.

EXAMPLE 11

The procedure described in Example 4 was carried out using 3 - ethyl - 4 - (5′ - nitro - 2′ - furfurylidene - amino - 1:2:4 - triazolone - 5 instead of 4 - (5′ - nitro - 2′-furfurylidene-amino)-1:2:4-triazolone-5, the reaction conditions being otherwise the same.

The product was 1 - acetyl - 3 - ethyl - 4 - (5′ - nitro-2′-furfurylidene-amino)-1:2:4-triazolone-5, having melting point 170° to 171° C.

EXAMPLE 12

The procedure described in Example 4 was carried out using 3-ethyl-4-(5′-nitro-2′ - furfurylidene-amino)-1:2:4-triazolone-5 instead of 4 - (5′-nitro-2′ - furfurylideneamino)-1:2:4-triazolone-5 and propionic anhydride instead of acetic anhydride, the reaction conditions being otherwise essentially the same.

The product was 1-propionyl-3-ethyl-4-(5′-nitro-2′-furfurylidene-amino)-1:2:4-triazolone-5, having melting point 156° to 158° C.

EXAMPLE 13

A mixture of 10.8 g. of 4-(5′-nitro-2′-furfurylidene-amino)-1:2:4-triazolone-5 and 565 ml. of 5% by weight aqueous formaldehyde solution was heated at reflux for 10 minutes and then cooled to room temperature. The crystalline yellow solid was collected by filtration, washed with ethanol and dried in vacuum at 80° C.

The product was 1-hydroxymethyl-4-(5′-nitro-2′-furfurylidene - amino)-1:2:4-triazolone-5, having melting point 189° C. with decomposition.

EXAMPLE 14

The procedure described in Example 13 was carried out using 3-methyl-4-(5′-nitro-2′-furfurylidene-amino)-1:2:4-triazolone-5 instead of 4-(5′-nitro-2′-furfurylideneamino)-1:2:4-triazolone-5, the reaction conditions being otherwise essentially the same.

The product was 1-hydroxymethyl-3-methyl-4-(5′-nitro-2′-furfurylidene-amino)-1:2:4-triazolone - 5, having melting point 264° C. with decomposition.

EXAMPLE 15

The procedure described in Example 13 was carried out using 3-ethyl-4-(5′-nitro - 2′-furfurylidene-amino)-1:2:4-triazolone-5 instead of 4-(5′-nitro-2′-furfurylideneamino)-1:2:4-triazolone-5, the reaction conditions being otherwise essentially the same.

The product was 1-hydroxymethyl-3-ethyl-4-(5′-nitro-2′-furfurylidene-amino)-1:2:4-triazolone-5, having melting point 172° to 174° C. with decomposition.

EXAMPLE 16

5 g. of ethyl chloroformate were slowly added to a suspension of 7.7 g. of 4-(5′-nitro-2′-furfurylideneamino)-1:2:4-triazolone-5 in 78 ml. of pyridine at 0° to 10° C. After stirring for one hour at 0° to 10° C., and 2½ hours at 25° C., the suspension was poured into 180 ml. of 2 N hydrochloric acid solution with cooling.

The pale yellow solid which separated was collected by filtration and recrystallised from 50:50 dimethyl formamide:ethanol. The product was 1-ethoxycarbonyl-4-(5′-nitro-2′-furfurylidene-amino)-1:2:4-triazolone-5, having melting point 207° C. with decomposition.

EXAMPLE 17

A mixture of 5.6 g. of 1-hydroxymethyl-4-(5′-nitro-2′-furfurylidene-amino)-1:2:4-triazolone-5, 4.2 g. of thionyl chloride and 14 ml. of benzene were heated at reflux for 1 hour. After cooling the reaction product, the yellow crystals that were formed were collected by filtration, washed with benzene, recrystallised from benzene and dried in vacuum at 60° C.

The product was 1-chloromethyl-4-(5′-nitro-2′-furfurylidene-amino)-1:2:4 - triazolone-5, having melting point 154° to 156° C.

By carrying out the procedure using thionyl bromide instead of the thionyl chloride, the reaction conditions being otherwise essentially the same, the product obtained is 1-bromoethyl-4-(5′ - nitro-2′ - furfurylidene-amino)-1:2:4-triazolone-5.

By carrying out the procedure using thionyl chloride but using 1-(2′-hydroxyethyl)-4-(5″-nitro-2″-furfurylideneamino)-1:2:4-triazolone-5 instead of the 1-hydroxymethyl-4-(5′-nitro-2′ - furfurylidene - amino)-1:2:4-triazolone-5, the reaction conditions being otherwise essentially the same, the product obtained is 1-(2′-chloroethyl)-4-(5″-nitro-2″ - furfurylidene - amino)-1:2:4-triazolone-5.

EXAMPLE 18

A mixture of 2.13 g. of 1-(5′-nitrofurfurylidene)-carbohydrazide and 3.24 g. of triethyl ortho-formate were heated at 100° C. for 36 hours and then cooled to room temperature. The yellow solid which was obtained was collected by filtration, washed with ethanol and dried in vacuum at 80° C.

4-(5′-nitro-2′-furfurylidene - amino)-1:2:4-triazolone-5 was produced, being identical with the product of Example 1.

EXAMPLE 19

A mixture of 5 g. of crotonyl chloride and 150 ml. of dimethyl formamide was added to a suspension of 10 g. of 4-(5′-nitro-2′-furfurylidene-amino)-1:2:4-triazolone-5 in 150 ml. of pyridine over 15 minutes at 25° to 30° C. After stirring for 3 hours at room temperature, 250 ml. of water were added.

The crystalline solid which was formed was collected by filtration, recrystallised from a mixture of ethyl alcohol and dimethyl formamide and dried in vacuum at 100° C. The product was 1-crotonyl-4-(5'-nitro-2'-furfurylidene-amino)-1:2:4 - triazolone-5, having melting point 217° to 219° C.

EXAMPLE 20

5.1 g. of 50% sodium hydride in mineral oil were added to a mixture of 20 g. of 4-benzylidene-amino-1:2:4-triazolone-5 in 500 ml. of dimethyl formamide. The mixture was heated to reflux until all the sodium hydride had reacted. 9.6 g. of 2-chloroethanol were then added and the mixture heated with stirring at 120° C. for 17 hours. The dimethyl formamide was then removed by distillation under reduced pressure and the residue was steam distilled in the presence of dilute sulphuric acid. The resulting aqueous solution was reacted with a mixture of 10.6 g. of 5-nitro-2-furaldehyde in 100 ml. of ethyl alcohol.

The yellow crystalline solid produced was collected by filtration, recrystallised from a mixture of ethyl alcohol and dimethyl formamide and dried in vacuum at 100° C. The product was 1-(2'-hydroxyethyl)-4-(5''-nitro-2''-furfurylideneamino)-1:2:4 - triazolone-5, having melting point 158° to 160°.

EXAMPLE 21

The procedure described in Example 20 was carried out using 3-chloropropanol instead of the 2-chloroethanol, the reaction conditions being otherwise essentially the same.

The product was 1-(3'-hydroxypropyl)-4-(5''-nitro-2''-furfurylidene-amino)-1:2:4-triazolone-5, having melting point 142° to 143° C.

EXAMPLE 22

The procedure described in Example 17 was carried out using 1 - (3'-hydroxypropyl)-4-(5''-nitro-2''-furfurylidene-amino)-1:2:4-triazolone-5 instead of 1-hydroxymethyl - 4 - (5'-nitro-2'-furfurylidene-amino)-1:2:4-triazolone-5, the reaction conditions being otherwise essentially the same.

The product was 1-(3'-chloropropyl)-4-(5''-nitro-2''-furfurylidene-amino)-1:2:4-triazolone - 5, having melting point 141° to 143° C.

The compounds of the invention or mixtures of any two or more thereof, may be formulated in conventional manner with pharmacologically acceptable solid carriers or liquid diluents.

We claim:
1. A 5 - nitro-2-furfurylidene-amino-triazolone having the formula

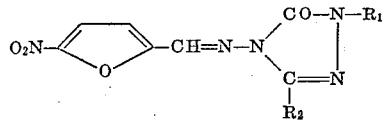

wherein $R_1$ is hydrogen or a hydroxy-lower alkyl, halogen-lower alkyl, lower alkanoyl, lower alkenoyl or lower alkoxy-carbonyl group, and $R_2$ is hydrogen or lower alkyl.

2. A compound as defined in claim 1 wherein the group $R_1$ is hydrogen or hydroxy-lower alkyl and $R_2$ is hydrogen or lower alkyl.

3. A compound as defined in claim 1 wherein $R_1$ is hydrogen and $R_2$ is hydrogen or lower alkyl.

4. The compound of the formula

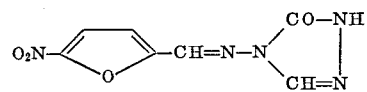

References Cited

UNITED STATES PATENTS 3,001,992    9/1961    Bellamy et al. _____ 260—240
3,314,947    4/1967    Benjamin _____ 260—240

OTHER REFERENCES

Zajdela et al.: Unio Intern. Contra Cancrum, Acta vol. 20 (1–2), pp. 233–9 (1964).

JOHN D. RANDOLPH, *Primary Examiner*.